(12) United States Patent
Scheuch et al.

(10) Patent No.: US 7,712,569 B2
(45) Date of Patent: May 11, 2010

(54) DEVICE AND METHOD FOR RAISING THE HOOD OF A MOTOR VEHICLE DURING A COLLISION WITH A PEDESTRIAN

(75) Inventors: Volker Scheuch, Sailauf (DE); Werner Schmidt, Alzenau (DE); Martin Zilg, Aschaffenburg (DE); Andree Hündling, Leer (DE); Frank Goseberg, Wuppertal (DE)

(73) Assignee: Magna Electronics Europe GmbH & Co. KG, Sailauf (DE)

( * ) Notice: Subject to any disclaimer, the term of this patent is extended or adjusted under 35 U.S.C. 154(b) by 694 days.

(21) Appl. No.: 10/559,796

(22) PCT Filed: May 13, 2004

(86) PCT No.: PCT/EP2004/005120

§ 371 (c)(1),
(2), (4) Date: Apr. 16, 2007

(87) PCT Pub. No.: WO2004/108486

PCT Pub. Date: Dec. 16, 2004

(65) Prior Publication Data

US 2007/0267892 A1 Nov. 22, 2007

(30) Foreign Application Priority Data

Jun. 6, 2003 (DE) ................. 103 26 140
Nov. 28, 2003 (DE) ................. 103 56 310

(51) Int. Cl.
B60R 21/34 (2006.01)
(52) U.S. Cl. ..................... 180/274; 180/69.21
(58) Field of Classification Search ........... 180/274, 180/69.21; B60R 21/34
See application file for complete search history.

(56) References Cited

U.S. PATENT DOCUMENTS

| 6,415,882 | B1 * | 7/2002 | Schuster et al. | 180/69.21 |
| 6,439,330 | B1 * | 8/2002 | Paye | 180/69.21 |
| 6,554,093 | B2 * | 4/2003 | Sasaki et al. | 180/274 |
| 2004/0124621 | A1 * | 7/2004 | Knight-Newbury et al. | 280/748 |

FOREIGN PATENT DOCUMENTS

| DE | 100 33 126 A1 * | 2/2001 |
| DE | 199 57 872 A1 * | 6/2001 |
| DE | 10252560 A1 * | 6/2003 |
| EP | 1 293 400 A2 | 3/2003 |
| EP | 1 295 762 A2 * | 3/2003 |
| EP | 1 319 561 A1 | 6/2003 |
| EP | 1424247 A1 * | 6/2004 |

(Continued)

*Primary Examiner*—Ruth Ilan
(74) *Attorney, Agent, or Firm*—Patent Central LLC; Stephan A. Pendorf

(57) ABSTRACT

The invention relates to a lifting device for raising the hood (20) of a motor vehicle during a collision with a pedestrian. The device comprises a retaining member (10) for connecting the hood (20) to the vehicle bodywork (14) and a pyrotechnic explosive unit (16) for detaching the retaining member (10). To guarantee a reliable operation, the device is equipped with lifting means (18) for raising the hood (20) into a collision position, the means being actuated by the energy of the explosive unit (16) released during the detachment of the retaining member (10).

8 Claims, 4 Drawing Sheets

FOREIGN PATENT DOCUMENTS

Figure 1:
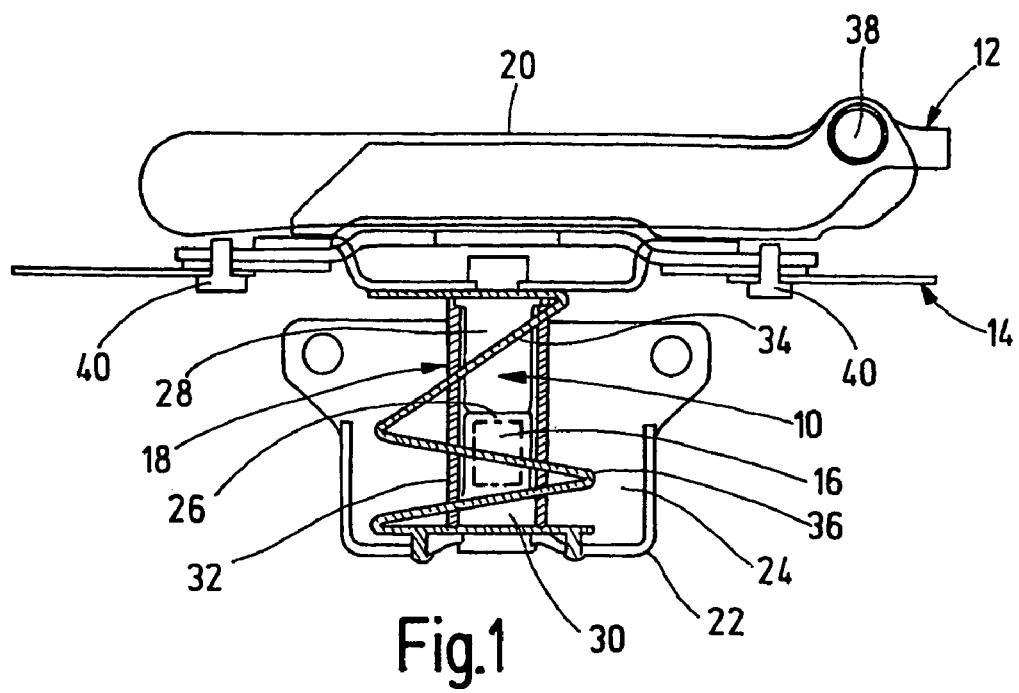

| | | | | |
|---|---|---|---|---|
| EP | 1452408 A2 | * | 9/2004 | |
| GB | 2373218 A | * | 9/2002 | |
| GB | 2 382 548 A | | 6/2003 | |
| GB | 2382548 A | * | 6/2003 | |
| GB | 2382549 A | * | 6/2003 | |
| GB | 2387577 A | * | 10/2003 | |
| WO | WO 02/072393 | * | 9/2002 | |
| WO | WO 03/086826 A1 | | 10/2003 | |

* cited by examiner

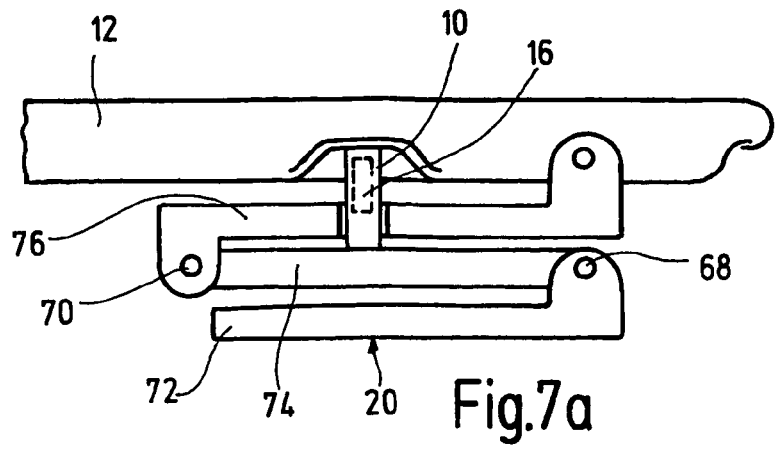
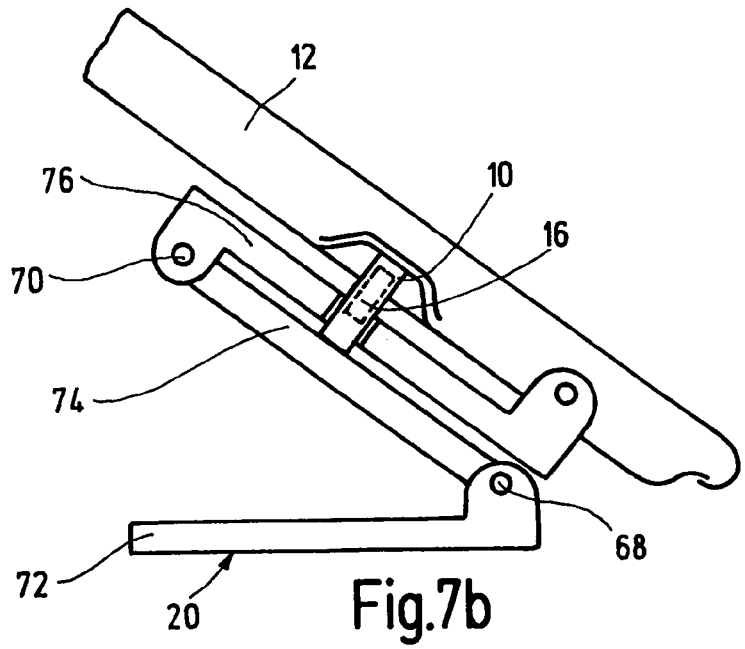
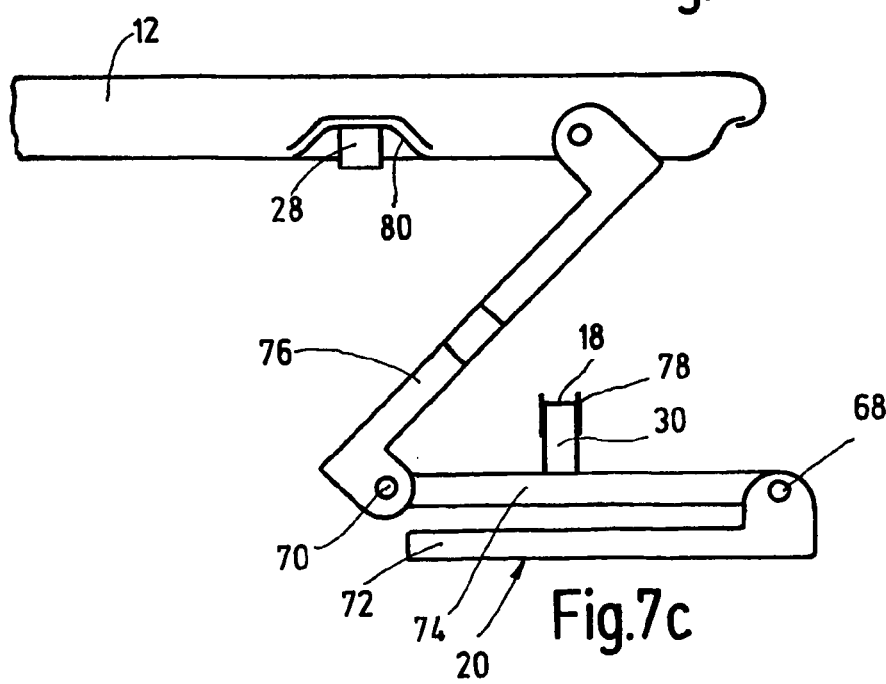

DEVICE AND METHOD FOR RAISING THE HOOD OF A MOTOR VEHICLE DURING A COLLISION WITH A PEDESTRIAN

CROSS REFERENCE TO RELATED APPLICATION

This application is a national stage of PCT/EP2004/005120 filed May 13, 2004 and based upon DE 103 26 140.0 filed Jun. 6, 2003 and based upon DE 103 56 310.5 filed Nov. 28, 2003 under the International Convention.

The invention concerns a device for lifting the front hood of a motor vehicle involved in a collision with a pedestrian, the device including a retaining member for securing the front hood to the vehicle body and a pyrotechnic explosive unit for releasing the retaining member. The invention further concerns a corresponding process.

From DE-A-102 52 560 a device of this type is known, in order to make possible, in the case of a collision with a pedestrian, a softer impact relative to the stiff substructure by lifting the deformable front hood. For engaging the front hood a pre-tensioned lifting spring is used, which is releasable via a pyrotechnic rapid separation device.

Besides this, it is also known to employ a pyrotechnic actuator for the setup movement, wherein the front hood lock is opened via a supplemental unlocking device. Herein the coordination between releasing and actuation is critical, for which at least two control signals are necessary. These must be separately checked for plausibility for avoidance of false actuation, which further retards reaction time.

Beginning therewith it is the task of the present invention to avoid the deficiencies according to the state of the art, and to provide simple means for a reliable lifting device.

The solution of this task is proposed by the combination of characteristics set forth in the independent claims. Advantageous embodiments and further developments of the invention can be seen from the dependent claims.

The invention is based upon the idea of combining releasing and actuation into a cohesive sequence. Accordingly, lift means actuatable by means of the energy released upon releasing of the retaining member are proposed for lifting the front hood into a collision position. In this manner, the pyrotechnic unit can serve a double function, in that the retaining connection between body and front hood is released, and with the excess energy the lift movement is driven. Thereby the time sequence is established, that is, a lifting is only then possible after the system is unlocked. A blocking of the actuator by an erroneous coordination of the control signals is thus precluded.

According to a preferred embodiment of the invention the retaining member forms a connecting element for a rigid connection, at least in the lift direction, between the front hood and the vehicle body.

Preferably the retaining member includes two retaining member parts separable along a intended breakage site separable by the explosive unit which, as lift means, are movable apart from each other by the explosive unit. In this manner it is possible to use the kinetic energy for the lift movement of the front hood.

In order to optimize the separation function, it is advantageous when the explosive unit is employed in a hollow chamber of the retaining element.

For transmission of the impulse caused by the propulsive gas stream of the explosive unit, the lift means can include a transmission element.

One advantageous embodiment envisions that the lift means includes the retaining member and the therein location explosive unit, in particular a cylinder unit forming a jacket or casing as transmission element. In order to better control the lift movement, it is advantageous when the lift means includes an expansion unit expanding in the lift direction by the propulsive gas of the explosive unit, preferably a fabric bag, folded bellows or telescopic pipe expansion unit.

Preferably the front hood is linked to the vehicle body via a multiply articulated hood hinge, wherein a first linkage is provided for normal operation and a second linkage is provided for the case of collision, and the hinge elements connected via the second linkage are secured to each other by the retaining member and can be spread relative to each other by the explosive unit.

A further advantageous embodiment envisions that the explosive unit is provided in a preferably swan-neck shaped hinge element of a hood hinge connecting the front hood with the vehicle body, and that the hinge element forming the retaining member is separable by the explosive unit.

According to a further advantageous embodiment the lift means includes a lift piston guided in a lift cylinder, wherein the lift piston is secured in a locked position by the retaining member and the retaining member is releasable by the propulsive gas of the explosive unit acting upon the lift cylinder. Herein it is advantageous when the retaining member, preferably in the form of a locating pin, forms a form-fitting engagement in the locking position between the lift piston and lift cylinder, and by means of the propulsive gas is moveable into an engagement releasing position.

A further variant envisions that the explosive unit is effective or useful simultaneously as gas generator with production of propulsive gas as well as pyrotechnic drive means.

For limiting and/or controlling the lift movement of the front hood it is advantageous to provide a lift limiter preferably connected to the hood and the body. Here it is advantageous when the lift limiter is a flexible fabric or a tearable or bendable sheet metal or a deformable plastic part.

A securing of the front hood against displacement transverse to the lift direction can be achieved by at least one aligning element engaging in an alignment opening.

With respect to the process the above described task is solved thereby, that the front hood is lifted by means of the energy of the explosive unit released during releasing or actuation of the retaining member, into a collision position.

Figure 2:
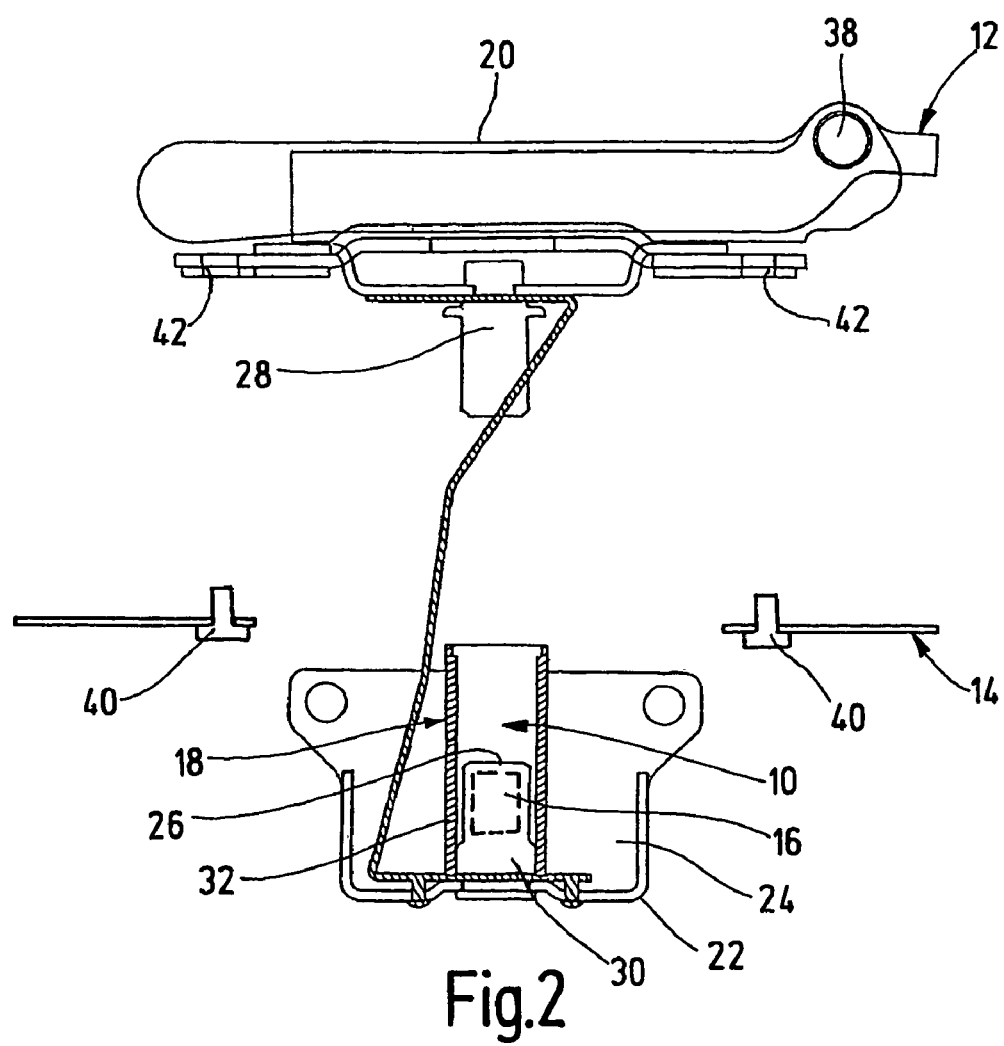
Figure 3:
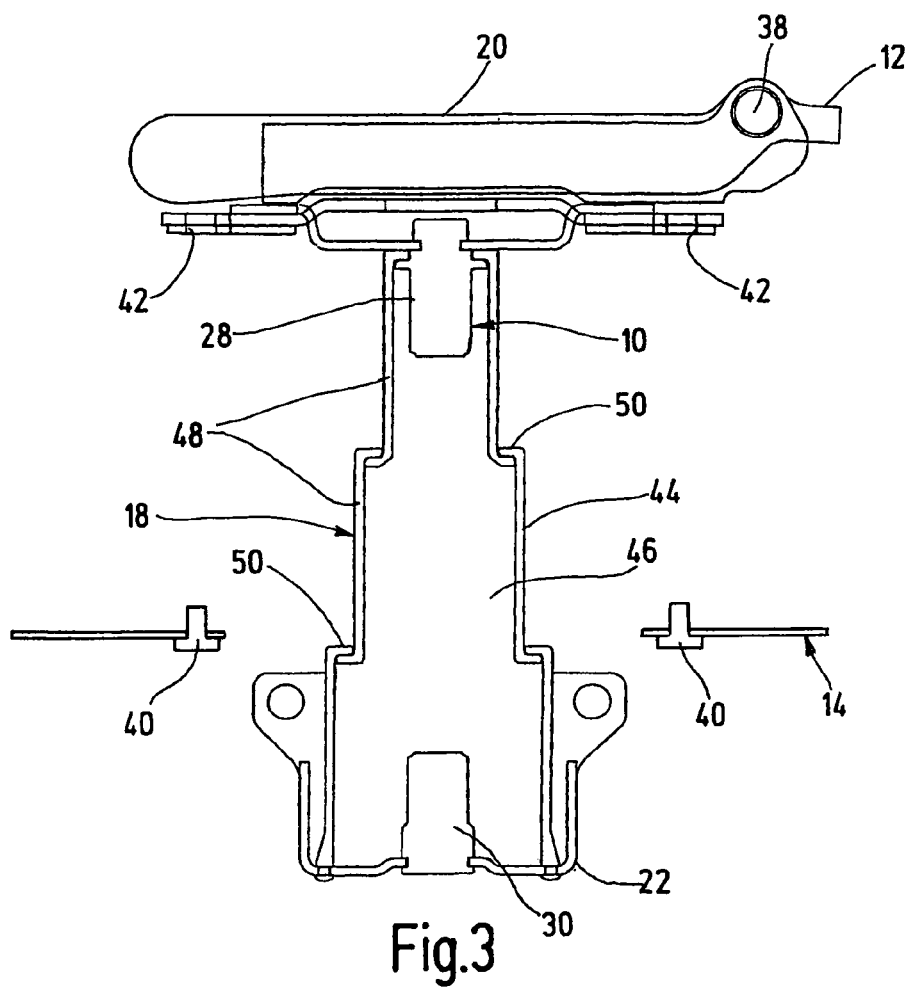
Figure 4:
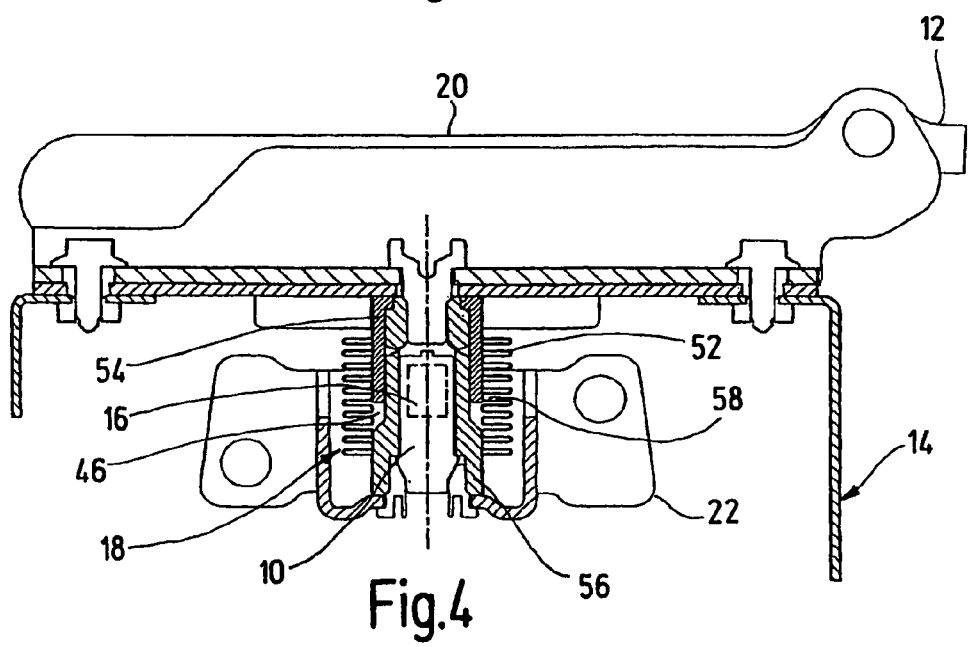
Figure 5:
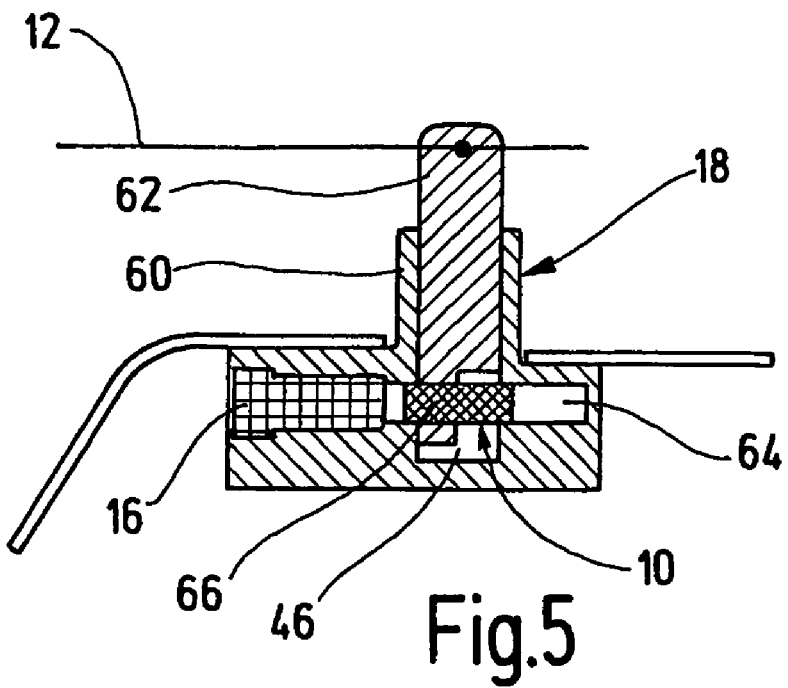
Figure 6:
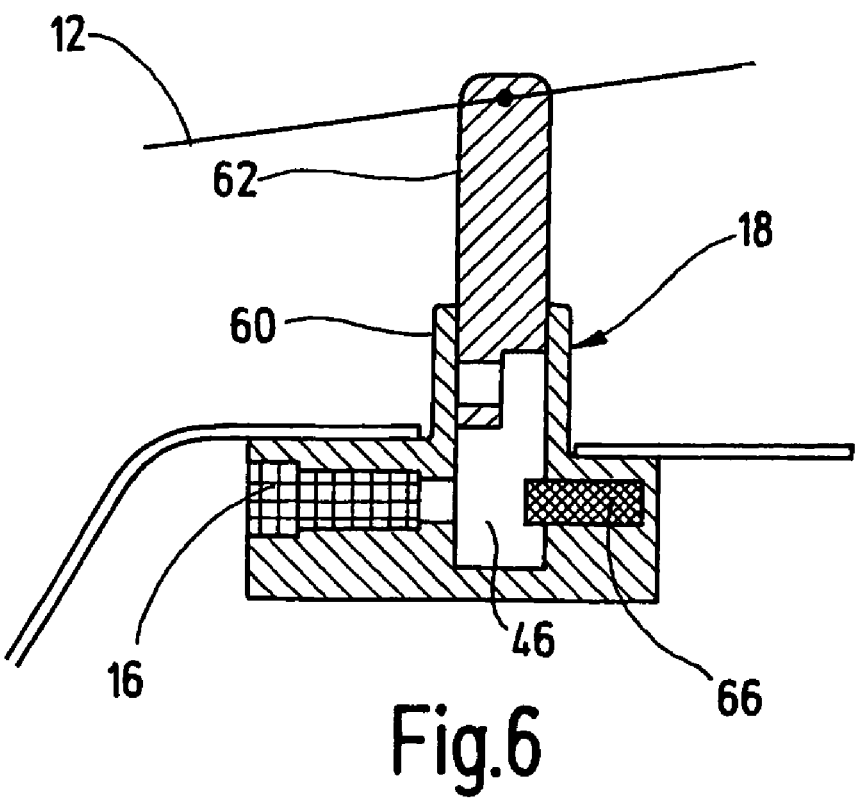

In the following the invention will be described in greater detail on the basis of the illustrative embodiment shown in schematic matter in the figures. There is shown in:

FIG. 1 a lift device for a front hood of a motor vehicle with a not triggered or activated or released condition in a vertical section:

FIG. 2 a lift device according to FIG. 1 in activated condition;

FIG. 3 a telescopic lift device in a representation corresponding to FIG. 2;

FIG. 4 a further lift device with a folded bellows as lift means in a representation corresponding to FIG. 1;

FIGS. 5 and 6 a lift device with a piston drive in the rest and actuated conditions in vertical section; and FIG. 7 a lift device and a multi-articulated hinge in various functional positions in a side view.

The lift devices shown in the figures serve for protection of pedestrians in the case of collision with a motor vehicle. They are comprised essentially of a retaining member 10 for securing the front hood 12 of the vehicle on the vehicle body 14, a pyrotechnic explosive unit 16 for releasing the retaining member 10 and lift means 18 for lifting the front hood 12 into a collision position. Upon the deployment of the deformable front hood 12 an impact energy absorbing deformation area relative to the there underlying motor block is produced, in order to minimize injury of the person being impacted.

In the embodiment shown in FIGS. 1 and 2 the shaft-shaped retaining member 10 is connected on its ends via a form fit to the hood hinges 20 and to a body-fixed connecting part 22. The connecting part 22 is formed by a flange plate 24 screwable to a vehicle longitudinal bearing member. The retaining member 10 is a hollow shaft, in which the pyrotechnic explosive charge 16 is introduced. The hollow shaft has a separation location or, as the case may be, an intended break location 26, corresponding to the explosive charge, which is formed by a vee-groove circumscribing the casing. The explosive unit 16 is rapidly activatable by not shown primer in the case that a suitable crash sensor detected an impact with pedestrian.

The retaining member 10 satisfies the task of connecting the hood hinges 20 to the vehicle body or chassis 14 in the operating condition via a rigid connection. It therewith makes possible a flow of force between the hood hinge 20 or, as the case may be, front hood 12, and the vehicle body 14. In the case of collision the connection to the intended breakage location 26 is separated or released, wherein the retaining member 10 separates into two member parts 28, 30. The member parts 28, 30 move away from each other in the lift direction subsequent to separation, using the excess energy of the explosive device 16.

In order to transmit targetedly the impulse initiated by the propulsive gas stream of the explosive unit 16, the lift means 18 is in the shape of a transmission element in the form of a casing 32. The casing 32 coaxially surrounds or encompasses the retaining member 10 thereby covering the intended breakage site 26. It thus forms some type of shot barrel, in order to directionally utilize the produced pressure force. As long as the separated holder part 28 is located within the casing 32, it is accelerated by the pressure of the produced propulsive gas, wherein the connected lift hinge 20 and therewith also the front hood 12 is lifted or, as the case may be, deployed. Outside of this acceleration range the lift movement is continued by the mass inertia of the device until achieving or reaching the end position.

The end position is determined by a lift limiter 34, which is formed by a piece of sheet metal which can be bent along bend lines 36. The sheet metal part is folded into multiple layers and bends upon lift movement into the extended position shown in FIG. 2. On its ends the sheet metal part 34 is secured to the flange plate 22 and to the lift hinge 24. Advantageously, the front hood 12 is lifted in its front area while the hood side in the direction of driving is preferably held in the sunk or recessed closed position via a linkage, so that overall a ramp elevated toward the front windshield is formed.

In the start or normal position the front hood 12 can be swung open about a hinge axis 38, in order to provide access to the engine compartment or as the case may be front compartment. For securing the hood hinge 20 against a displacement transverse to the generally upwardly running lift direction, guide pins 40 are provided which are provided fixed to the body and engaged in vertical hood-side fittings or holes 42.

In the following illustrative examples the same or similar parts are referenced using the same reference numbers.

The embodiment shown in FIG. 3 differs essentially therein that, in place of a vehicle-fixed casing, a telescope pipe 44 extendible in the lift direction is provided as lift means. This telescopic pipe 44 envelops the retaining member 10 and the therein located explosive unit 16 so that the produced drive gas supports a lift movement in the internal space 46. Therein the telescoping pipe parts 48 form folds or notches or rabbets engaging in each other for limiting the lift movement.

FIG. 4 shows a device with a folded bellows 52 of a thin sheet metal as lift means. This concentrically encloses the shaft of the retaining member 10, wherein the bellows end sections are rigidly connected via internally lying casing parts 54, 56, axially engaging into each other, with the hood hinge 20 and the connecting part 22. Here also the propulsive gas released in the internal space 46 of the folded bellows 52 drives the lift device, while the circumscribing folds 58 are extended or stretched. In this manner the lift movement is dampened and at the same time a lift limitation in the extended position is achieved.

In the embodiment according to FIGS. 5 and 6 the lift means 18 includes a lift piston 62 guided in the lift cylinder 60, which on its upper end is linked to the front hood 12. On its cylinder end the lift piston 62 is form-fittingly secured in its locked position shown in FIG. 5 via the retaining member 10. Herein the retaining member 10 in the form of a guide pin 64 is guided in a transverse channel 64 running transverse through the cylinder space 46. The pyrotechnic unit 16 introduced in the transverse channel 64 acts in this case essentially as gas generator or, as the case may be, pyrotechnic drive means. The drive gas produced upon triggering is first directed to the facing side of the guide pin 66, which thereby is moved out of its locking position into the release position shown in FIG. 6. Thereby the piston 62 is released and the cylinder space 46 is acted on its floor side with drive gas, so that the hood 12 is moved to the lifted end position, limited by the not shown abutments.

In the illustrative embodiment according to FIG. 7 a multi-articulated hood hinge 20 is provided for various functional positions. FIG. 7a shows the normal position of the closed front hood 12, while FIG. 7b shows the open position and FIG. 7c the collision position of the front hood 12. The mentioned positions are achieved by alternating spreading apart or opening of the hinge or linkage elements 68, 70 in the z-fold, with hinge elements 72, 74, 76 connected to each other. In normal operation the retaining member 10 connects the upper hinge elements 74, 76 rigidly with the front hood 12. In the case of collision the holder element 10 is exploded as shown in FIG. 7c, whereby the holder parts 28, 30 separated from each other simultaneously transmit, as lift means, the pressure impulse for the lifting of the front hood 12. In order to better utilize the drive or propulsive gas, the separating location 18 can be enveloped by a jacket 78, while the upper retaining member part 28 is provided recessed in a capture depression or basin 80 of the engine hood 12.

As not individually shown, it is also possible, that the explosive unit is provided in a hinge element of swan neck hinge carrying the front hood. In the case of triggering, the pyrotechnic explosive unit separates the hinge element forming the retaining member and provides the energy for positioning the front hood. Therein it is advantageous when a deformation element introduced or inserted in the hinge neck guides, dampens or limits the lift movement. The front hood can also be held in the activated position by the deformation element and the impact energy of the pedestrian can be absorbed.

The invention claimed is:

1. A device for lifting the front hood (20) of a motor vehicle in case of collision with a pedestrian, comprising
    a retaining member (10) for securing the hood (20) to a vehicle body (14), and
    a pyrotechnic explosive unit (16) for releasing the retaining member (10), wherein the energy released by the explosive unit (16) upon releasing the retaining member (10) also actuates lift means (18) for lifting the front hood (20) into a collision position, wherein the explosive unit (16) is in a hollow space in the retaining member (10), wherein the lift means (18) includes a lift device expandable by means of the propulsion gas of the explosive unit (16), is connected to the hood and the body and limits and/or guides the lift movement of the hood, and wherein the lift device expandable by means of the propulsion gas of the explosive unit (16) is a fabric bag, a folded bellows or telescopic pipe expansion unit (44; 58).

2. The device according to claim 1, wherein the retaining member (10) forms a connecting element for rigid connection of the hood (20) with the vehicle body (14) in at least the lift direction.

3. The device according to claim 1, wherein the retaining member (10) includes two retaining member parts (28, 30) separable along an intended break line or site by the explosive unit (16), and that the retaining member parts (28, 30) are movable apart from each other as lift means (18) by the explosive unit (16).

4. The device according to claim 1, wherein the lift means (18) includes a transmission element for transmission of the impulse released by the propulsive gas of the explosive unit (16).

5. The device according to claim 1, wherein the explosive unit (16) while effective as pyrotechnic drive means produces propulsive or drive gas.

6. The device according to claim 1, wherein for securing the front hood (20) against a displacement transverse to the lift direction, at least one guide element (40) engaging in a guide opening (42) is provided.

7. A motor vehicle including a device for lifting the front hood (20) of the motor vehicle in case of collision with a pedestrian, said device comprising a retaining member (10) for securing the hood (20) to a vehicle body (14), a pyrotechnic explosive unit (16) for releasing the retaining member (10), wherein the energy released by the explosive unit (16) upon releasing the retaining member (10) also actuates lift means (18) for lifting the front hood (20) into a collision position, wherein the explosive unit (16) is in a hollow space in the retaining member (10), wherein the lift means (18) includes a lift device expandable by means of the propulsion gas of the explosive unit (16), is connected to the hood and the body and limits and/or guides the lift movement of the hood, and wherein the lift device expandable by means of the propulsion gas of the explosive unit (16) is a fabric bag, a folded bellows or telescopic pipe expansion unit (44; 58).

8. A process for lifting the front hood (20) of a motor vehicle during a collision with a pedestrian, in which the front hood (20) is secured to the vehicle body (14) in operating condition via a retaining member (10), said process comprising:

in the case of collision, releasing the connection by the retaining member (10) by means of the pyrotechnic explosive unit (16), wherein the front hood (20) is lifted into a collision position by means of the energy of the explosive unit (16) released upon releasing of the retaining member (10), wherein the explosive unit (16) is in a hollow space in the retaining member (10), wherein the lift means (18) includes a lift device expandable by means of the propulsion gas of the explosive unit (16), is connected to the hood and the body and limits and/or guides the lift movement of the hood, and wherein the lift device expandable by means of the propulsion gas of the explosive unit (16) is a fabric bag, a folded bellows or telescopic pipe expansion unit (44; 58).

* * * * *